(12) United States Patent
Li et al.

(10) Patent No.: US 10,543,476 B2
(45) Date of Patent: Jan. 28, 2020

(54) POROUS MATERIALS, METHODS OF MANUFACTURE THEREOF AND ARTICLES COMPRISING THE SAME

(71) Applicant: The University of Massachusetts, Boston, MA (US)

(72) Inventors: Yinyong Li, Sunderland, MA (US); Kenneth Raymond Carter, Hadley, MA (US); Kara Martin, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 71 days.

(21) Appl. No.: 15/669,172

(22) Filed: Aug. 4, 2017

(65) Prior Publication Data
US 2018/0036713 A1     Feb. 8, 2018

Related U.S. Application Data (60) Provisional application No. 62/370,892, filed on Aug. 4, 2016.

(51) Int. Cl.
*B01J 20/24* (2006.01)
*B01J 20/30* (2006.01)
(Continued)

(52) U.S. Cl.
CPC ............ *B01J 20/24* (2013.01); *B01D 53/62* (2013.01); *B01J 20/28011* (2013.01); *B01J 20/28045* (2013.01); *B01J 20/28047* (2013.01); *B01J 20/3064* (2013.01); *B01J 20/3085* (2013.01); *C08B 15/06* (2013.01); *C08J 9/28* (2013.01);
(Continued)

(58) Field of Classification Search
None
See application file for complete search history.

(56) References Cited

U.S. PATENT DOCUMENTS 8,668,924 B2 *  3/2014  McCarthy ........... A61F 13/0203
                                                     424/445
9,675,561 B2 *  6/2017  Bencherif ............ A61K 9/7007
(Continued)

OTHER PUBLICATIONS

Aulin et al.; "Aerogels from nanofibrillated cellulose with tunable oleophobicity"; Soft Matter, 6; 2010, pp. 3298-3305.
(Continued)

*Primary Examiner* — Joseph D Anthony
(74) *Attorney, Agent, or Firm* — Cantor Colburn LLP (57) ABSTRACT

Disclosed herein is a porous material comprising a biopolymer functionalized with a carbon dioxide capturing moiety; where the biopolymer is in the form of a foam or an aerogel having a bulk density of 500 grams per cubic meter to 2500 grams per cubic meter. Disclosed herein too is a method comprising functionalizing a biopolymer with a carbon dioxide capturing moiety; dissolving the biopolymer in an aqueous solution to form a first solution; reducing the temperature of the first solution to below the freezing point of the aqueous solution; displacing the aqueous solution with a first solvent that has a lower surface tension than a surface tension of the aqueous solution; and drying the first solvent to produce a porous biopolymer having a bulk density of 500 grams per cubic meter to 2500 grams per cubic meter.

4 Claims, 3 Drawing Sheets

EDC/NHS Coupling of Amino Acid or Peptide to Oxidized Nanocellulose (51) Int. Cl.
B01D 53/62 (2006.01)
C08K 3/04 (2006.01)
B01J 20/28 (2006.01)
C08B 15/06 (2006.01)
C08J 9/28 (2006.01)

(52) U.S. Cl.
CPC .... C08K 3/041 (2017.05); *B01D 2252/20494* (2013.01); *C08J 2201/05* (2013.01); *C08J 2205/026* (2013.01); *C08J 2301/08* (2013.01); *C08K 2201/011* (2013.01)

(56) References Cited

U.S. PATENT DOCUMENTS

| | | | |
|---|---|---|---|
| 10,006,072 B2* | 6/2018 | Bernardi | C12Q 1/025 |
| 10,253,255 B2* | 4/2019 | Omary | C09K 11/025 |
| 2014/0227327 A1* | 8/2014 | Bencherif | A61K 9/7007 424/400 |
| 2016/0206773 A1* | 7/2016 | Mousa | A61L 15/44 |
| 2017/0027168 A1* | 2/2017 | Heath | A01N 25/30 |
| 2018/0036713 A1* | 2/2018 | Li | B01J 20/24 |

OTHER PUBLICATIONS

Auriemma et al.; "Slow Crystallization Kinetics of Poly(vinyl alcohol) in Confined Environment during Cryotropic Gelation of Aqueous Solutions"; Macromolecules, 39; 2006, pp. 9429-9434.
Carrick et al.; "Lightweight, Highly Compressible, Noncrystalline Cellulose Capsules"; Langmuir, 30; 2014, pp. 7635-7644.
Cebeci et al.; "Nanoporosity-Driven Superhydrophilicity: A Means to Create Multifunctional Antifogging Coatings"; Langmuir, 22; 2006, pp. 2856-2862.
Cervin et al.; "Lightweight and Strong Cellulose Materials Made from Aqueous Foams Stabilized by Nanofibrillated Cellulose"; Biomacromolecules, 14; 2013, pp. 503-511.
Ehmann et al.; "Design of anticoagulant surfaces based on cellulose nanocrystals"; Chem. Commun., 50; 2014, pp. 13070-13072.
Fuchigami et al.; "Structural and Textural Changes in Kinu-Tofu Due to High-Pressure-Freezing"; Journal of Food Science, vol. 62, No. 4.; 1997, pp. 828-837.
Ganesan et al.; "Design of aerogels, cryogels and xerogels of cellulose with hierarchical porous structures"; Materials and Design 92; 2016, pp. 345-355.
Isogai et al.; "Tempo-oxidized cellulose nanofibers"; Nanoscale, 3, 71; 2011, pp. 71-85.
Javadi et al.; "Polyvinyl Alcohol-Cellulose Nanofibrils-Graphene Oxide Hybrid Organic Aerogels"; ACS Appl. Mater. Interfaces, 5; 2013, pp. 5969-5975.
Jiang et al.; "Super water absorbing and shape memory nanocellulose aerogels from Tempo-oxidized cellulose nanofibrils via cyclic freezing—thawing"; J. Mater. Chem. A, 2; 2014, pp. 350-359.
Lee et al.; "Zwitter-Wettability and Antifogging Coatings with Frost-Resisting Capabilities"; ACS Nano, vol. 7, No. 3, 2013, pp. 2172-2185.
Moon et al.; "Cellulose nanomaterials review: structure, properties and nanocomposites"; Chem. Soc. Rev., 40; 2011, pp. 3941-3994.
Paakko et al.; "Long and entangled native cellulose I nanofibers allow flexible aerogels and hierarchically porous templates for functionalities"; Soft Matter, 4; 2008, pp. 2492-2499.
Peterson et al.; "Surface-Grafted Conjugated Polymers for Hybrid Cellulose Materials"; Journal of Polymer Science Part A: Polymer Chemistry, vol. 49; 2011, pp. 3004-3013.
Pour et al.; "Xerocellulose: lightweight, porous and hydrophobic cellulose prepared via ambient drying"; J Mater Sci, 50; 2015, pp. 4526-4535.
Rudaz et al.; "Aeropectin: Fully Biomass-Based Mechanically Strong and Thermal Superinsulating Aerogel"; Biomacromolecules, 15; 2014, pp. 2188-2195.
Sehaqui et al.; "High-porosity aerogels of high specific surface area prepared from nanofibrillated cellulose (NFC)"; Composites Science and Technology 71; 2011, pp. 1593-1599.
Toivonen et al.; "Ambient-Dried Cellulose Nanofibril Aerogel Membranes with High Tensile Strength and Their Use for Aerosol Collection and Templates for Transparent, Flexible Devices"; Adv. Funct. Mater., 25; 2015, pp. 6618-6626.
Zhang et al.; "Aerogels from crosslinked cellulose nano/microfibrils and their fast shape recovery property in water"; J. Mater. Chem., 22; 2012, pp. 11642-11650.
Zhang et al.; "Ultralightweight and Flexible Silylated Nanocellulose Sponges for the Selective Removal of Oil from Water"; Chem. Mater., 26; 2014, pp. 2659-2668.

* cited by examiner

POROUS MATERIALS, METHODS OF MANUFACTURE THEREOF AND ARTICLES COMPRISING THE SAME

CROSS REFERENCE TO RELATED APPLICATION

This application claims priority to U.S. Provisional Application No. 62/370,892 filed on Aug. 4, 2016, the entire contents of which are hereby incorporated by reference.

STATEMENT REGARDING FEDERALLY SPONSORED RESEARCH OR SUPPORT

This invention was made with government support under NSF Grant No. DMR-0820506-Material Research Science and Engineering Center on Polymers at UMASS and NSF Grant No. CMMI-1025020-UMASS Center for Hierarchical Manufacturing (CHM) and NSF Grant No. DMR-1506968. The government has certain rights in the invention.

BACKGROUND

This disclosure relates to porous materials, methods of manufacture thereof and to articles comprising the same. In particular, this disclosure relates to the preparation of foams and aerogels that are operative to capture carbon dioxide and other combustion gases.

Most aerogels prepared from inorganic materials (such as silica, titania, zirconia, or the like) or from organic materials (such as resorcinol formaldehyde, melamine formaldehyde, or the like) use supercritical drying or freeze drying. These techniques use supercritical fluids that are supercritical at high pressures and temperatures and can sometimes be safety hazards. Other supercritical fluid based methods use low pressure solvent removal and/or freezing and both of these methods are energy intensive methods and therefore involve high production costs. It is therefore desirable to manufacture aerogels by methods that are less expensive and that involve methods that are safe and less hazardous.

In addition, aerogels have a large surface areas. Carbon dioxide gas is known to be a greenhouse gas and legislation has been enacted in a number of countries to reduce carbon dioxide emissions into the atmosphere. It is therefore desirable to produce devices that can be used in the capture of carbon dioxide and that thereby reduce emissions into the atmosphere.

SUMMARY

Disclosed herein is a porous material comprising a bioactive polymer; where the bioactive polymer is in the form of a foam or an aerogel having a bulk density of 500 grams per cubic meter to 2500 grams per cubic meter.

Disclosed herein too is a method comprising dissolving a biopolymer in an aqueous solution to form a first solution; reducing the temperature of the first solution to below the freezing point of the aqueous solution; displacing the aqueous solution with a first solvent that has a lower surface tension than a surface tension of the aqueous solution; and drying the first solvent to produce a porous biopolymer having a bulk density of 500 grams per cubic meter to 2500 grams per cubic meter.

Disclosed herein is a porous material comprising a biopolymer functionalized with a carbon dioxide capturing moiety; where the biopolymer is in the form of a foam or an aerogel having a bulk density of 500 grams per cubic meter to 2500 grams per cubic meter.

Disclosed herein too is a method comprising functionalizing a biopolymer with a carbon dioxide capturing moiety; suspending the biopolymer in an aqueous solution to form a first solution; reducing the temperature of the first solution to below the freezing point of the aqueous solution; displacing the aqueous solution with a first solvent that has a lower surface tension than a surface tension of the aqueous solution; and drying the first solvent to produce a porous biopolymer having a bulk density of 500 grams per cubic meter to 2500 grams per cubic meter.

DETAILED DESCRIPTION

Porous Materials

Disclosed herein is a method of manufacturing porous materials (e.g., foams, aerogels, or a combination thereof) from a biopolymer (that is hydrophillic) comprising freezing the hydrophillic polymer in an aqueous solution and exchanging the frozen aqueous matrix with a solvent at temperatures that are lower than the freezing point of aqueous solution. It is desirable for the solvent exchange temperature to be lower than the freezing point of water but higher than that of aqueous solvent so that the ice can gradually melt in order to maintain the shape of gel. The disclosed method is advantageous in that the entire process can be accomplished at ambient pressure and room temperature. It therefore consumes less energy, is cost-effective, and safe. The aqueous solution and other solvents can be easily recovered and recycled/reused.

The method comprises manufacturing a composition that comprises an aqueous solution of a biopolymer with a biopolymer concentration of 0.5 wt % to 11 wt %, based on the total weight of the composition. The biopolymer is generally present in the composition in an amount of 0.5 to 11 wt %, preferably 1.5 to 10 wt % and more preferably 2 to 9 wt %, based on the total weight of the composition. The aqueous solution is frozen by cooling it to a low temperature of 0 to −196° C.

The aqueous solution is generally present in an amount of 89 to 99.5 wt % based on the total weight of the biopolymer with the aqueous solution. The aqueous solution contains water. It may contain one or more solvents that are compatible with water. Examples of water compatible solvents are alcohols, furans, ketones, diols, glycols, or the like, or a combination thereof. A list of water compatible solvents includes acetaldehyde, acetic acid, acetone, acetonitrile, butanediol, 2-butoxyethanol, diethanolamine, diethylenetriamine, dimethylformamide, dimethoxyethane, dimethyl sulfoxide, 1,4-dioxane, ethylamine, ethylene glycol, formic acid, glycerol, methyl diethanolamine, 1,3-propanediol, 1,5-pentanediol, propylene glycol, pyridine, tetrahydrofuran, triethylene glycol, or the like, or a combination thereof.

Aqueous solvents can also have salts or bases in addition to the water. Examples of salts include chlorides, nitrates, sulfates, chromates, permanganates, or the like, or a combination thereof. Examples of bases are hydroxides, carbonates, amines, or the like, or a combination thereof When water is blended with another solvent, a salt or a base to form the aqueous solvent, the water is generally present in an amount of 60 to 95 wt %, preferably 70 to 90 wt % and more preferably 75 to 85 wt %, based on the total weight of the aqueous solvent.

The mixing can be of the aqueous solution with the biopolymer can be conducted in a mixing device such as an extruder (single screw or twin screw), a Waring blender, a Henschel mixer, a Buss kneader, a Brabender, a Banbury, or a combination thereof. After the mixing, the solution containing the biopolymer may be placed in a vessel or on a continuous belt and cooled to temperatures of 0 to −196° C., preferably −5 to −100° C. and more preferably −10 to −80° C. During the cooling of the biopolymer into its frozen state, it is converted to a gel and is trapped in the frozen aqueous solution.

Following the cooling, the frozen composition is placed in a solvent bath that contains a solvent that is compatible with water. A solvent exchange process takes place where the water in the frozen composition is replaced with a first solvent that preferably has lower surface tension than water.

A second solvent may then be used to displace the first solvent. The second solvent preferably has a lower surface tension that the first solvent. In this manner a plurality of solvents may be used to displace a solvent from the gel. Each succeeding solvent has a lower surface tension than the preceding solvent.

The solvent exchange is generally conducted at temperatures of −10 to 150° C., preferably −20 to 90° C. and more preferably −30 to 75° C. After the solvent exchange, the gel is subjected to drying at a temperature of 15 to 150° C. to produce the porous material. The porous material can be a foam, an aerogel, or a combination thereof.

The first solvent is preferably compatible with water and displaces water from the frozen gel. The first solvent is preferably a polar solvent. Examples of suitable solvents are alcohols (e.g., methanol, ethanol, n-propanol, isopropanol), ketones (e.g., acetone, methyl ethyl ketone), tetrahydrofuran, acetonitrile, dimethylformamide, or the like, or a combination thereof.

To ensure the complete exchange of water with the first solvent, this first solvent exchange process can be repeated several times or the bath can be refreshed with new solvent. After the first solvent exchange, a second solvent exchange is performed to minimize the collapsing of gel structure during the drying. The second solvent may be compatible with the first solvent and generally has a lower surface tension and a higher vapor pressure than the first solvent. The second solvent may preferably be a non-polar solvent and can include hexane, cyclo-hexane, heptane, octane, nonane, or the like, or a combination thereof.

The biopolymer may be a naturally occurring biopolymer, a synthetic biopolymer or a combination thereof. Examples of naturally occurring biopolymers include cellulose, reduced crystallinity cellulose, polysaccharides, chitosan, oligochitosan, gelatin, collagen, hydroxyalkyl celluloses such as hydroxypropyl cellulose, hydroxymethylcellulose and hydroxyethylcellulose; hydroxyethyl methyl cellulose, polynucleotides, polypeptides, proteins, or the like, or a combination thereof. The biopolymers can comprise nano-sized particles. Examples include cellulose nanocrystals (CNC), cellulose nanofibrils (NFC), starch nanoparticles any type of biopolymer nanoparticles, or a combination thereof.

Synthetic biopolymers include nonionic polymers, polyelectrolytes, polyzwitterions, polyampholytes, polybetaines, or the like, or a combination thereof.

Synthetic biopolymers include synthetic biodegradable polymers are as polylactic-glycolic acid (PLGA), polycaprolactone (PCL), copolymers of polylactic-glycolic acid and poly-caprolactone (PCL-PLGA copolymer), polyhydroxy-butyrate-valerate (PHBV), polyorthoester (POE), polyethylene oxide-butylene terephthalate (PEO-PBTP), poly-D,L-lactic acid-p-dioxanone-polyethylene glycol block copolymer (PLA-DX-PEG), or the like, or a combination thereof.

In an embodiment, other synthetic polymers that are water soluble or soluble in blends of water with other solvents may be blended with the biopolymer to manufacture the porous materials. In another embodiment, other synthetic polymers that are immiscible with the biopolymer may also be blended with the biopolymer to manufacture the porous materials. Synthetic polymers (that are not biopolymers) that can be blended with the biopolymers are thermoplastic polymers, thermosetting polymers, blends of thermoplastic polymers, blends of thermosetting polymers, and blends of thermoplastic polymers with thermosetting polymers. The polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer for blending with the reduced crystallinity cellulose is a thermoplastic polymer. The polymer may be semi-crystalline of amorphous.

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, polyacrylamides, or the like, or a combination comprising at least one of the foregoing organic polymers.

Examples of thermosetting polymers suitable for blending with the reduced crystallinity cellulose include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

In an embodiment, the synthetic polymers listed above can be infused in their precursor form into dried porous material from a solvent. After infusion, the solvent is dried and the precursors are cured at elevated temperature, giving rise to a hybrid aerogel that comprises the biopolymer and the synthetic polymer.

When synthetic polymers are added to the biopolymer to form a blend, the biopolymer is generally present in an amount of 50 to 99 wt %, preferably 70 to 95 wt % and more preferably 80 to 90 wt %, based on the total weight of the synthetic polymer and the biopolymer. The synthetic polymer is present in the blend in an amount of 1 to 50 wt %, preferably 5 to 30 wt % and more preferably 10 to 20 wt %, based on the total weight of the synthetic polymer and the biopolymer.

Other additives may be added to the composition that contains the aqueous solvent and the biopolymer. The additives may include nanoparticles, electrically conducting particles, thermally conducting particles, or the like, or a combination thereof.

Examples of such nanoparticles include carbon nanotubes, graphene oxide, silver nanoparticles, gold nanoparticles, clay nanoparticles, silica nanoparticles, zinc oxide nanoparticles, titania nanoparticles, or the like, and can be incorporated into the biopolymer-aqueous solvent mixture prior freezing, so as to prepare hybrid aerogel. These nanoparticles can be synthesized in situ and deposited directly onto nanocellulose fibers or crystals.

These nanoparticles may be present in the form of nanotubes, nanorods, whiskers, nanodots, nanoonions, buckeyeballs, or the like, or a combination thereof.

The nanoparticles have average largest particle dimensions of 10 to 150 nanometers, preferably 20 to 100 nanometers and more preferably 30 to 90 nanometers.

An example of a hybrid aerogel is a nanofibril cellulose combined with polyvinylalcohol and treated as detailed above.

Blowing agents may also be optionally added to the biopolymer to assist in the foaming. It is generally desirable to use blowing agents in an amount effective to produce a fairly uniform cell size in the foam. The blowing agent generally acts in conjunction with the curing agent to facilitate a uniform crosslink density as well as a uniform pore size in the foam. The blowing agents may be physical blowing agents or chemical blowing agents. Physical blowing agents are released from the composition as a result of binodal decomposition and expand during the blowing process to form the foam while chemical blowing agents decompose to liberate gases (e.g., azo compounds) during the blowing process to form a foam.

Physical blowing agents comprising hydrogen atom-containing components, may be used alone or as mixtures with each other or with another type of blowing agent (e.g., chemical blowing agents) such as azo compounds. The physical blowing agents may be selected from a broad range of materials, including hydrocarbons, ethers, esters and partially halogenated hydrocarbons (e.g., perfluorinated hydrocarbons), ethers and esters, and the like. Typical physical blowing agents have a boiling point between −50° C. and 100° C., and preferably between −50° C. and 50° C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethyl ether and difluoromethyl-1,1,1-trifluoroethyl ether; and the hydrocarbons such as n-pentane, isopentane, cyclopentane, or the like.

Gaseous non-CFC or non-HCFC physical blowing agents such as carbon dioxide, nitrogen, dinitroso-pentamethylenetetramine, $SF_6$, nitrous oxide, argon, helium, noble gases, such as xenon, air (nitrogen and oxygen blend), and blends of these gases. The gases may be used as blowing agents in the gaseous state, a liquid state or in a supercritical state.

Chemical blowing agents include azobisisobutyronitrile (AIBN), azodicarbonamide, dinitroso-pentamethylene-tetramine, p-toluene sulfonyl hydrazide, p,p'-oxy-bis(benzenesulfonyl hydrazide), or combinations thereof may be used to produce the foam. An exemplary azo compound is azobisisobutyronitrile. In order to tailor expansion-decomposition temperature and foaming processes, a blowing agent may also be a mixture of blowing agents or of blowing agents and an activator.

The blowing agent is used in an amount of 1 to 10 wt %, preferably 1.5 to 5 wt % and more preferably 2 to 4 wt %, based on the total weight of the porous material. Blowing agents if used, are added to the solution of the aqueous solution and the biopolymer and are typically activated after the porous material is formed. The blowing of the blowing agent can be used to reduce form density and to change the pore structure.

The foam composition may also include 0.1 to 10 wt %, preferably 1 to 5 wt % of an activator to lower the decomposition temperature/profile of blowing agents. An activator can be one or more metal oxides, metal salts, or organometallic complexes, or a combination thereof. Examples include zinc oxide, zinc stearate, magnesium oxide, or combinations of two or more thereof.

Other additives that may be added to the resulting porous materials include silicon alkoxides, silanes, and silazanes (e.g., trimethoxysilane, tetraethoxysilane, hexamethyldisilazane, trichlorosilane, tetrachlorosilane, or the like), aluminum and titanium alkoxides, or the like, or a combination thereof.

The porous materials as manufactured have a density of 500 grams per cubic meter to 3500, preferably 700 to 3000 and more preferably 800 to 2800 grams per cubic meter. The aerogels may be electrically conducting if desired by the incorporation of electrically conducting materials into the porous material. The foams and aerogels may be used in a variety of different applications such as thermal insulation, acoustic barriers, cushioning materials, shock absorbers, and the like.

The porous materials disclosed herein are exemplified by the following non-limiting example.

Porous Materials with Carbon Dioxide Capture Capabilities

Disclosed herein is a method of manufacturing porous materials (e.g., foams, aerogels, or a combination thereof) from a biopolymer that contains a moiety capable of reacting with carbon dioxide (hereinafter the carbon dioxide capturing moiety). The high surface area of the porous materials permits large contact surfaces where the carbon dioxide can effectively contact the moiety that is capable of reacting with it. The porous materials may thus be used to capture carbon dioxide from a stream of gases that contain carbon dioxide.

The porous material may be manufactured by supercritical drying, freeze drying or by ambient temperature drying. In one embodiment, the method of producing the porous material includes freeze drying. This method comprises freezing a hydrophillic polymer that is functionalized with the carbon dioxide capturing moiety in an aqueous solution and exchanging the frozen aqueous matrix with a solvent at temperatures that are lower than the freezing point of the aqueous solution. The hydrophillic polymer that is functionalized with the carbon dioxide capturing moiety will hereinafter be termed the biopolymer. It is desirable for the solvent exchange temperature to be lower than the freezing point of water but higher than that of aqueous solvent so that the ice can gradually melt in order to maintain the shape of gel. The disclosed method is advantageous in that the entire process can be accomplished at ambient pressure and room temperature. It therefore consumes less energy, is cost-effective, and safe. The aqueous solution and other solvents can be easily recovered and recycled/reused.

In another embodiment, the method comprises supercritically drying the biopolymer after solvent exchange to produce an aerogel. In another embodiment, the method comprises drying the biopolymer at conditions other than supercritical conditions (e.g., at room temperature or at an elevated temperature and/or pressure to produce a foam). In an exemplary embodiment, the biopolymer is manufactured into an aerogel via freeze drying.

An aerogel is a synthetic porous ultralight material derived from a gel, in which the liquid component of the gel has been replaced with a gas. The result is a solid with extremely low density and low thermal conductivity. Aerogels are produced by extracting the liquid component of a gel through supercritical drying or through freeze drying. This allows the liquid to be slowly dried off without causing the solid matrix in the gel to collapse from capillary action, as would happen with conventional evaporation. In an aerogel the average pore sizes are less than 100 nanometers, preferably less than 50 nanometers, and more preferably less than 20 nanometers.

A foam is also a porous material with average pore sizes greater than 100 nanometers, preferably greater than 0.5 micrometers, and more preferably from 1 micrometers to 10 micrometers. The foams and aerogels are preferably open celled porous materials. Foams have larger pore sizes than aerogels.

The method comprises manufacturing a composition that comprises an aqueous solution of the biopolymer with a biopolymer concentration of 0.5 wt % to 11 wt %, based on the total weight of the composition. The biopolymer is generally present in the composition in an amount of 0.5 to 11 wt %, preferably 1.5 to 10 wt % and more preferably 2 to 9 wt %, based on the total weight of the composition. The aqueous solution is frozen by cooling it to a low temperature of 0 to $-196°$ C.

The aqueous solution is generally present in an amount of 89 to 99.5 wt % based on the total weight of the biopolymer with the aqueous solution. The aqueous solution contains water. It may contain one or more solvents that are compatible with water. Examples of water compatible solvents are alcohols, furans, ketones, diols, glycols, or the like, or a combination thereof. A list of water compatible solvents includes acetaldehyde, acetic acid, acetone, acetonitrile, butanediol, 2-butoxyethanol, diethanolamine, diethylenetriamine, dimethylformamide, dimethoxyethane, dimethyl sulfoxide, 1,4-dioxane, ethylamine, ethylene glycol, formic acid, glycerol, methyl diethanolamine, 1,3-propanediol, 1,5-pentanediol, propylene glycol, pyridine, tetrahydrofuran, triethylene glycol, or the like, or a combination thereof.

Aqueous solvents can also have salts or bases in addition to the water. Examples of salts include chlorides, nitrates, sulfates, chromates, permanganates, or the like, or a combination thereof. Examples of bases are hydroxides, carbonates, amines, or the like, or a combination thereof When water is blended with another solvent, a salt or a base to form the aqueous solvent, the water is generally present in an amount of 60 to 95 wt %, preferably 70 to 90 wt % and more preferably 75 to 85 wt %, based on the total weight of the aqueous solvent.

The mixing can be of the aqueous solution with the biopolymer can be conducted in a mixing device such as an extruder (single screw or twin screw), a Waring blender, a Henschel mixer, a Buss kneader, a Brabender, a Banbury, or a combination thereof. After the mixing, the solution containing the biopolymer may be placed in a vessel or on a continuous belt and cooled to temperatures of 0 to $-196°$ C., preferably $-5$ to $-100°$ C. and more preferably $-10$ to $-80°$ C. During the cooling of the biopolymer into its frozen state, it is converted to a gel and is trapped in the frozen aqueous solution.

Following the cooling, the frozen composition is placed in a solvent bath that contains a solvent that is compatible with water. A solvent exchange process takes place where the water in the frozen composition is replaced with a first solvent that preferably has lower surface tension than water.

A second solvent may then be used to displace the first solvent. The second solvent preferably has a lower surface tension that the first solvent. In this manner a plurality of solvents may be used to displace a solvent from the gel. Each succeeding solvent has a lower surface tension than the preceding solvent.

The solvent exchange is generally conducted at temperatures of $-10$ to $150°$ C., preferably $-20$ to $90°$ C. and more preferably $-30$ to $75°$ C. After the solvent exchange, the gel is subjected to drying at a temperature of 15 to $150°$ C. to produce the porous material. The porous material can be a foam, an aerogel, or a combination thereof.

The first solvent is preferably compatible with water and displaces water from the frozen gel. The first solvent is preferably a polar solvent. Examples of suitable solvents are alcohols (e.g., methanol, ethanol, n-propanol, isopropanol), ketones (e.g., acetone, methyl ethyl ketone), tetrahydrofuran, acetonitrile, dimethylformamide, or the like, or a combination thereof.

To ensure the complete exchange of water with the first solvent, this first solvent exchange process can be repeated several times or the bath can be refreshed with new solvent. After the first solvent exchange, a second solvent exchange is performed to minimize the collapsing of gel structure during the drying. The second solvent may be compatible with the first solvent and generally has a lower surface tension and a higher vapor pressure than the first solvent. The second solvent may preferably be a non-polar solvent and can include hexane, cyclo-hexane, heptane, octane, nonane, or the like, or a combination thereof.

The biopolymer may be a naturally occurring biopolymer, a synthetic biopolymer or a combination thereof. Examples of naturally occurring biopolymers include cellulose, reduced crystallinity cellulose, polysaccharides, chitosan, oligochitosan, gelatin, collagen, hydroxyalkyl celluloses such as hydroxypropyl cellulose, hydroxymethylcellulose and hydroxyethylcellulose; polynucleotides, polypeptides, proteins, or the like, or a combination thereof. The biopolymers can comprise nano-sized particles. Examples include cellulose nanocrystals (CNC), cellulose nanofibrils (NFC), starch nanoparticles any type of biopolymer nanoparticles, or a combination thereof.

Synthetic biopolymers include nonionic polymers, polyelectrolytes, polyzwitterions, polyampholytes, polybetaines, or the like, or a combination thereof.

Synthetic biopolymers include synthetic biodegradable polymers are as polylactic-glycolic acid (PLGA), polycaprolactone (PCL), copolymers of polylactic-glycolic acid and poly-caprolactone (PCL-PLGA copolymer), polyhydroxy-butyrate-valerate (PHBV), polyorthoester (POE), polyethylene oxide-butylene terephthalate (PEO-PBTP), poly-D,L-lactic acid-p-dioxanone-polyethylene glycol block copolymer (PLA-DX-PEG), or the like, or a combination thereof.

The biopolymers may be in the form of fibrils (e.g., nanofibrils), crystals (e.g., nanocrystals), a network, or a combination thereof.

In an embodiment, other synthetic polymers that are water soluble or soluble in blends of water with other solvents may be blended with or reacted with the biopolymer to manufacture the porous materials. The combination of a naturally occurring or synthetic biopolymer with a synthetic polymer is also referred to as a biopolymer. The combination may result in a blend or in the formation of a copolymer.

In another embodiment, other synthetic polymers that are immiscible with the biopolymer may also be blended or reacted with the biopolymer to manufacture the porous materials. Synthetic polymers (that are not biopolymers) that can be blended with the biopolymers are thermoplastic polymers, thermosetting polymers, blends of thermoplastic polymers, blends of thermosetting polymers, and blends of thermoplastic polymers with thermosetting polymers. The polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer for blending with the reduced crystallinity cellulose is a thermoplastic polymer. The polymer may be semi-crystalline of amorphous.

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, polyacrylamides, or the like, or a combination comprising at least one of the foregoing organic polymers. Amine containing organic polymers such as, for example, polyamides, polyesters, polysulfides, and polyurethanes are preferred.

Examples of thermosetting polymers suitable for blending with the reduced crystallinity cellulose include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Prior to being solvated with the solvent, the biopolymer is oxidized to form reactive sites for reacting with the carbon dioxide capturing moiety. The biopolymer may be oxidized using chemical oxidation (e.g., treating it with an oxidant such as 2,2,6,6-(tetramethylpiperidin-1-yl)oxy (TEMPO), treating it with an acid (dilute or concentrated such as nitric acid, sulfuric acid, hydrochloric acid, or a combination thereof, or by treatment with radiation such as with xrays, electron beams, gamma radiation, or a combination thereof.)

Following oxidation, the biopolymer is reacted with the carbon dioxide capturing moiety. Materials that comprise the carbon dioxide capturing moiety include amine containing materials. Examples of amine containing materials include amino acids, imines, or a combination thereof. The carbon dioxide capturing moiety may be a small molecule (e.g., a monomer, dimer, trimer, tetramer, pentamer, or an oligomer having a number average molecular weight of less than 1000 grams per mole) or a polymer having a number average molecular weight of greater than 1000 grams per mole, preferably greater than 5000 grams per mole and more preferably greater than 10,000 grams per mole.

Examples of amino acids that may be used to functionalize the biopolymer include tryptophan, tyrosine, valine, phenylalanine, glycine, arginine, orthinine, aspartate, histidine, glutamine, cysteine, isoleucine, leucine, alanine, lysine, glutamine, asparagine, or a combination thereof. Polymeric forms or other derivatives of the foregoing biopolymers may also be used. In an exemplary embodiment, the amino acid is arginine or poly(arginine).

The biopolymer may also be functionalized using amines. The foamed biopolymer (including aerogels) may also be immersed in an amine solvent. The amine solvent may not be reacted (i.e., covalently or ionically bonded) with the biopolymer molecules. The biopolymer has hydroxyl groups that can undergo hydrogen bonding with the amine solvent molecules. The amine solvents can then react with carbon dioxide to capture it from a carbon dioxide stream.

Examples of amines that may be used to functionalize or to saturate the foam may include primary, secondary and tertiary alkanolamines; primary and secondary amines; sterically hindered amines; and severely sterically hindered secondary aminoether alcohols. These include monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, 2-(2-(1-methyl-1-ethylpropylamino)ethoxy)ethanol, or the like, or a combination thereof.

Examples of imines include ethylene imine, propylene imine, 1,2-butylene imine, C-propyl ethylene imine, 2,3-butylene imine, C-amyl ethylene imine, 1,1-diethyl ethylene imine, 2,3-hexylene imine, C-butyl ethylene imine, or the like, or a combination thereof. Higher alkylene imines include C-dodecyl ethylene imine, 2,3-decylene imine, C-cetyl ethylene imine, C-octadecyl ethylene imine, C-decyl, C'-dodecyl ethylene imine, polyethyleneimine, or the like, or a combination thereof.

The biopolymer is functionalized with the carbon dioxide capturing moiety in an amount of 0.5 to 30 weight percent, based on the total weight of the biopolymer.

In another embodiment, the synthetic polymers listed above can be infused in their precursor form into dried porous material from a solvent. The precursors are preferably precursors to amine and imine containing polymers. After infusion, the solvent is dried and the precursors are cured at elevated temperature, giving rise to a hybrid aerogel that comprises the biopolymer and the synthetic polymer.

When synthetic polymers are added to the biopolymer to form a blend, the biopolymer is generally present in an amount of 50 to 99 wt %, preferably 70 to 95 wt % and more preferably 80 to 90 wt %, based on the total weight of the synthetic polymer and the biopolymer. The synthetic polymer is present in the blend in an amount of 1 to 50 wt %, preferably 5 to 30 wt % and more preferably 10 to 20 wt %, based on the total weight of the synthetic polymer and the biopolymer.

Other additives may be added to the composition that contains the aqueous solvent and the biopolymer. The additives may include nanoparticles, electrically conducting particles, thermally conducting particles, or the like, or a combination thereof.

Examples of such nanoparticles include carbon nanotubes, graphene oxide, silver nanoparticles, gold nanoparticles, clay nanoparticles, silica nanoparticles, zinc oxide nanoparticles, titania nanoparticles, or the like, and can be incorporated into the biopolymer-aqueous solvent mixture prior freezing, so as to prepare hybrid aerogel. These nanoparticles can be synthesized in situ and deposited directly onto nanocellulose fibers or crystals.

These nanoparticles may be present in the form of nanotubes, nanorods, whiskers, nanodots, nanoonions, buckeyeballs, or the like, or a combination thereof.

The nanoparticles have average largest particle dimensions of 10 to 150 nanometers, preferably 20 to 100 nanometers and more preferably 30 to 90 nanometers.

An example of a hybrid aerogel is a nanofibril cellulose combined with polyvinylalcohol and treated as detailed above.

Blowing agents may also be optionally added to the biopolymer to assist in the foaming. It is generally desirable to use blowing agents in an amount effective to produce a fairly uniform cell size in the foam. The blowing agent generally acts in conjunction with the curing agent to facilitate a uniform crosslink density as well as a uniform pore size in the foam. The blowing agents may be physical blowing agents or chemical blowing agents. Physical blowing agents are released from the composition as a result of binodal decomposition and expand during the blowing process to form the foam while chemical blowing agents decompose to liberate gases (e.g., azo compounds) during the blowing process to form a foam.

Physical blowing agents comprising hydrogen atom-containing components, may be used alone or as mixtures with each other or with another type of blowing agent (e.g., chemical blowing agents) such as azo compounds. The physical blowing agents may be selected from a broad range of materials, including hydrocarbons, ethers, esters and partially halogenated hydrocarbons (e.g., perfluorinated hydrocarbons), ethers and esters, and the like. Typical physical blowing agents have a boiling point between $-50°$ C. and $100°$ C., and preferably between $-50°$ C. and $50°$ C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethyl ether and difluoromethyl-1,1,1-trifluoroethyl ether; and the hydrocarbons such as n-pentane, isopentane, cyclopentane, or the like.

Gaseous non-CFC or non-HCFC physical blowing agents such as carbon dioxide, nitrogen, dinitroso-pentamethylenetetramine, $SF_6$, nitrous oxide, argon, helium, noble gases, such as xenon, air (nitrogen and oxygen blend), and blends of these gases. The gases may be used as blowing agents in the gaseous state, a liquid state or in a supercritical state.

Chemical blowing agents include azobisisobutyronitrile (AIBN), azodicarbonamide, dinitroso-pentamethylene-tetramine, p-toluene sulfonyl hydrazide, p,p'-oxy-bis(benzenesulfonyl hydrazide), or combinations thereof may be used to produce the foam. An exemplary azo compound is azobisisobutyronitrile. In order to tailor expansion-decomposition temperature and foaming processes, a blowing agent may also be a mixture of blowing agents or of blowing agents and an activator.

The blowing agent is used in an amount of 1 to 10 wt %, preferably 1.5 to 5 wt % and more preferably 2 to 4 wt %, based on the total weight of the porous material. Blowing agents if used, are added to the solution of the aqueous solution and the biopolymer and are typically activated after the porous material is formed. The blowing of the blowing agent can be used to reduce form density and to change the pore structure.

The foam composition may also include 0.1 to 10 wt %, preferably 1 to 5 wt % of an activator to lower the decomposition temperature/profile of blowing agents. An activator can be one or more metal oxides, metal salts, or organometallic complexes, or a combination thereof. Examples include zinc oxide, zinc stearate, magnesium oxide, or combinations of two or more thereof.

Other additives that may be added to the resulting porous materials include silicon alkoxides, silanes, and silazanes (e.g., trimethoxysilane, tetraethoxysilane, hexamethyldisilazane, trichlorosilane, tetrachlorosilane, or the like), aluminum and titanium alkoxides, or the like, or a combination thereof.

The porous materials as manufactured have a density of 500 grams per cubic meter to 3500, preferably 700 to 3000 and more preferably 800 to 2800 grams per cubic meter. The aerogels may be electrically conducting if desired by the incorporation of electrically conducting materials into the porous material. The foams and aerogels may be used in a variety of different applications such as thermal insulation, acoustic barriers, cushioning materials, shock absorbers, and the like.

The porous materials disclosed herein are exemplified by the following non-limiting examples.

EXAMPLE

Example 1

This example details a method for the preparation of an aerogel that is capable of capturing carbon dioxide from a vent stream that contains carbon dioxide. The aerogel composite was manufactured using an ambient drying method. The composite comprises nanocellullose, either cellulose nanofibrils (CNF) and/or cellulose nanocrystals (CNC) which is functionalized with a moiety that contains amine functionalities. The carbon dioxide capturing moiety that is used to functionalize the cellulose nanofibrils (CNF) and/or cellulose nanocrystals (CNC) comprises an arginine. Poly (arginine) was used to functionalize the cellulose to produce the carbon dioxide capturing aerogel.

This example demonstrates the development of a $CO_2$ capture material from amino acid functionalized porous nanocellulose foam/aerogel materials. Amino acids have diverse R groups that can be used to adsorb greenhouse gases. For example, amine containing amino acids can chemically bind to carbon dioxide through acid-base chemistry. Additionally, hydrophobic amino acids can collect methane and other hydrocarbon gases through strong Van der Waals interactions between the gas and the amino acid. In this example, poly(arginine) was used as an example of an amine-containing amino acid that can adsorb carbon dioxide. Nanocellulose can comprise cellulose nanocrystals (CNC) or cellulose nanofibrils (CNF), made from chemically and/or mechanically treated cellulose. CNF, for example, can be prepared from starting sources such as paper pulp which is further chemically oxidized with 2,2,6,6-(tetramethyl piperidin-1-yl)oxy (TEMPO).

Figure 1:
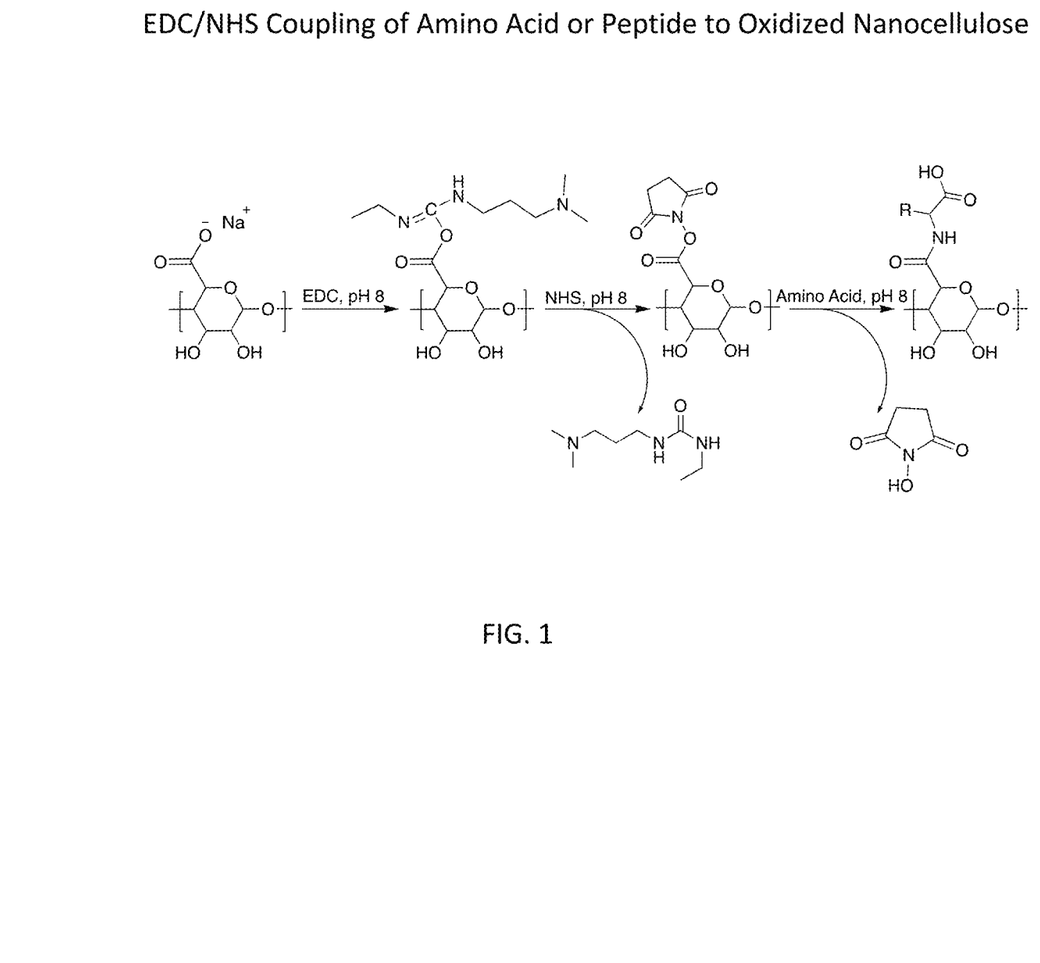
FIG. 1 depicts an exemplary reaction that shows how oxidized CNF is reacted with amino acids, n-hydroxyl succinimide (NETS), and 1-ethyl-3-(3-dimethylaminopropyl)carbodiimide (EDC), which results in CNF modified with reactive amine sites.

Using an amino acid coupling reaction, oxidized CNF is reacted with arginine, n-hydroxyl succinimide (NETS), and 1-ethyl-3-(3-dimethylaminopropyl)carbodiimide (EDC) which results in CNF modified with reactive amine sites (see FIG. 1). The amino acid-functionalized CNF can be further processed into a foam or aerogel by freeze-drying, super-critical drying, or ambient drying. In this example, an ambient drying method was used to produce a cellulose aerogel functionalized with the carbon capture moiety.

A 4% dispersion of poly(arginine) functionalized CNF in water is sonicated for 2 minutes and then slowly frozen at −72° C. The frozen CNF immediately undergoes solvent exchange with ethanol while held at −20° C. freezer for 12 hours. Afterwards, the sample is allowed to warm to room temperature (−20° C.) and continues to solvent exchange with ethanol for 3 days. The ethanol solution is refreshed each day. After solvent exchange, the resulting gel is dried at ambient pressure to give a robust monolithic poly(arginine) functionalized NFC aerogel.

Figure 2:
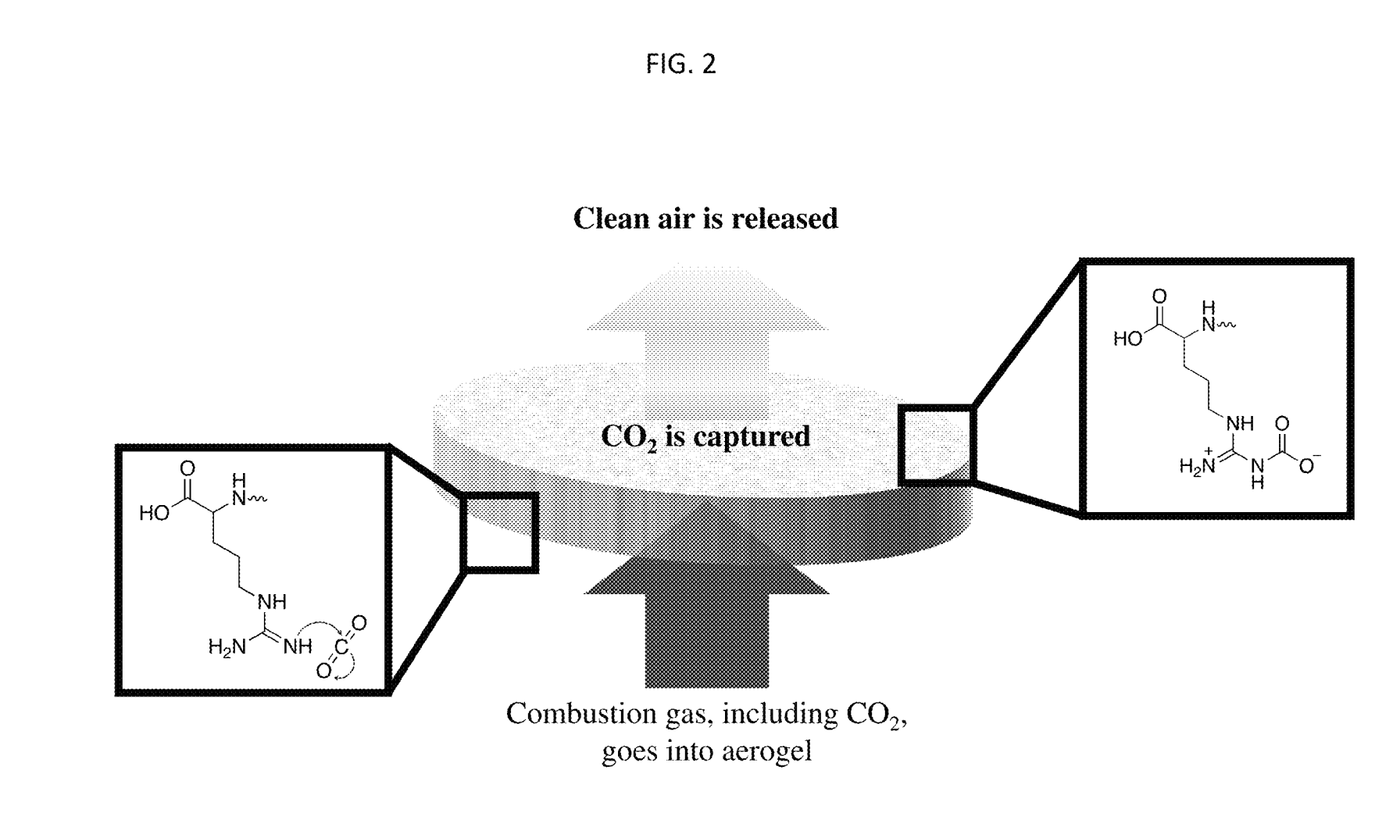
FIG. 2 is a schematic depiction of an exemplary carbon dioxide capture reaction in a cellulose foam or aerogel.

The free primary, secondary, and tertiary amine groups in arginine function as capture sites for $CO_2$. When a gas stream containing $CO_2$ flows through the aerogel, $CO_2$ molecules undergo a chemical reaction with the amines, resulting in the formation of ammonium carbamate and quaternary nitrogen pairs that are bound to the aerogel. FIG. 2 is a schematic depiction of an exemplary carbon dioxide capture reaction in a cellulose foam or aerogel. Successful $CO_2$ capture can be confirmed through Fourier transform infrared spectroscopy (FTIR) and microbalance measurements. After capture, $CO_2$ can be removed from the aerogels by heating to 100° C. for 20 minutes. After desorption, the aerogels can be reused to capture more $CO_2$. Preliminary results show that poly(arginine) functionalized CNF aerogels can capture 1.3 mmol $CO_2$/gram over 15 minutes at 40° C., and that capture capacity is improved with exposure time and over consecutive exposures to $CO_2$.

An advantage to using amino acid-functionalized CNF aerogels for $CO_2$ capture is that the materials are biodegradable, and do not produce toxic by-products during degradation. Theoretically, they can be composted after they reach 100% $CO_2$ capture capacity, rather than recycling via the more energy intensive desorption process.

Figure 3:
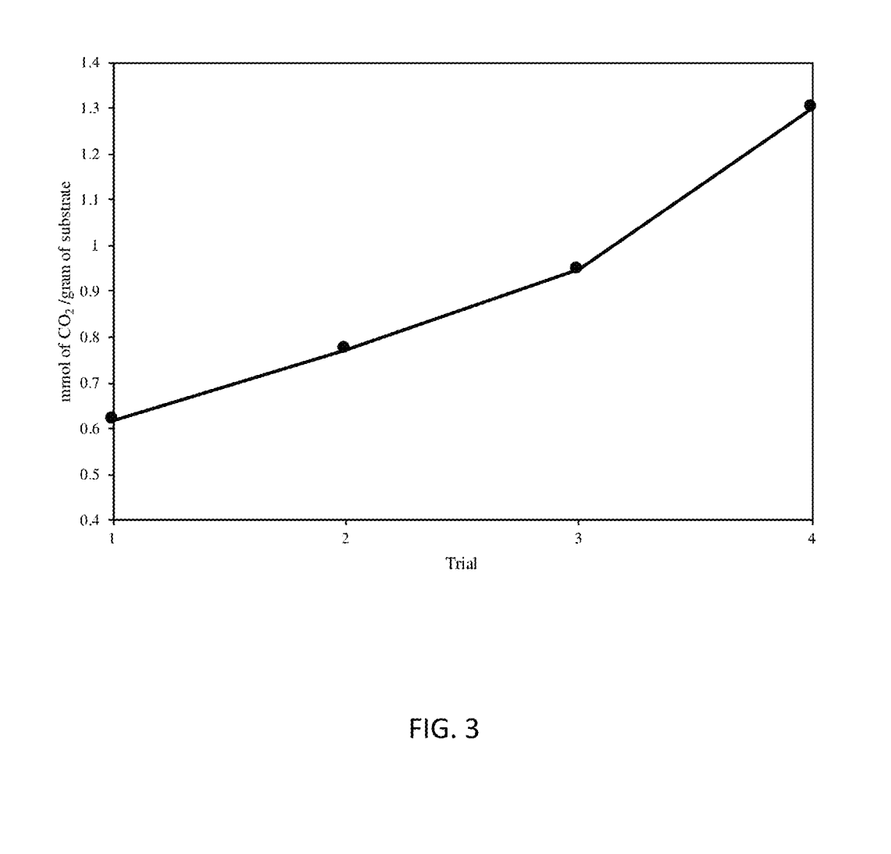
FIG. 3 is a graph that shows carbon dioxide adsorption data for the carbon dioxide capture aerogel.

The carbon capture aerogel detailed above was exposed to $CO_2$ over four trials. The sample weight was around 0.2 grams and the sample was placed in an oven and was filled with 100% $CO_2$ at 40 degrees C. for ten minutes. This was done after the sample was "desorbed" of all gases and the "desorbed" sample weight was taken prior to the carbon dioxide absorption. Then the sample was removed and weighed after being exposed to $CO_2$. The first three trials lasted 10 minutes and the last trial last 15 minutes. After each trial, the material underwent a desorption process. Sample absorption data is shown in the graph of the FIG. 3.

The carbon dioxide capture foams and aerogel detailed herein may be advantageously used in wet scrubbers installed in power plants.

Example 2

This example details a method for the preparation of electrically conductive aerogel composite using an ambient drying method. The composite comprises nanocellullose, either cellulose nanofibrils (CNF) and/or cellulose nanocrystals (CNC) and a conductive component, either carbon nanotube (CNT), graphene, graphite or a mixture thereof.

In this example, highly porous solids comprising nanocellulose and CNTs are used to demonstrate the invention.

Both CNF and CNC were prepared starting from common sources of pulp. In the case of CNF, commercial pulp was further acted upon using mechanical mixing processes and/or chemical oxidation. For example, treatment with 2,2,6,6-tetramethylpiperidin-1-yl)oxy (TEMPO) or its derivatives causes cellulose oxidization yielding CNF.

CNC was prepared from commercial pulp by either acid hydrolysis in water or by employing mechanical processes and chemical oxidation.

The CNT used in this invention can be either pristine CNT or oxidized CNT and can be either single-walled, double-walled, multi-walled, or a combination thereof. CNT can be dispersed in water using surfactant or oxidation. Nanocelulose can also be used as surfactant to disperse CNT. By mixing the nanocellulose dispersion with CNT solution, a homogeneous, deep dark solution was achieved.

The mixture was frozen at low temperature (0 to −196° C.). The frozen composite was placed in a solvent bath, and the solvent chosen must be miscible with water. A solvent exchange process takes place where the water in the gel is replaced with the other solvent which preferably has lower surface tension than water.

Solvents appropriate for this process can be methanol, ethanol, n-propanol, isopropanol, acetone, tetrahydrofuran, acetonitrile, dimethylformamide, or a co-mixture of several solvents.

To ensure the complete exchange of water with solvent, this solvent exchange process can be repeated several times or the bath can be refreshed with new solvent.

In some cases, after the first set of solvent exchanges, a second solvent exchange is required to minimize the collapsing of structure during the drying. The second solvent should have lower surface tension and higher vapor pressure than the first solvent and can include hexanes, heptane, octane, nonane, and the like.

And after solvent exchange, the solvent infused nanocellulose/CNT composite is dried at ambient pressure to obtain aerogel. The drying can be accomplished at temperatures where the solvent can evaporate, typically ranging between 15 and 150° C.

In the example above, solvents appropriate for this process can be methanol, ethanol, n-propanol, isopropanol, acetone, tetrahydrofuran, acetonitrile, dimethylformamide, or a co-mixture of several solvents.

To ensure the complete exchange of water with solvent, this solvent exchange process can be repeated several times or the bath can be refreshed with new solvent.

In some cases, after the first set of solvent exchanges, a second solvent exchange is required to minimize the collapsing of structure during the drying. The second solvent should have lower surface tension and higher vapor pressure than the first solvent and can include hexanes, heptane, octane, nonane, and the like.

And after solvent exchange, the solvent infused nanocellulose/CNT composite is dried at ambient pressure to obtain aerogel. The drying can be accomplished at temperatures where the solvent can evaporate, typically ranging between 15 and 150° C.

It is to be noted that all ranges detailed herein include the endpoints. Numerical values from different ranges are combinable.

The transition term comprising encompasses the transition terms "consisting of" and "consisting essentially of."

The term "and/or" includes both "and" as well as "or." For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method comprising:
    functionalizing a biopolymer with a carbon dioxide capturing moiety;
    dissolving the biopolymer in an aqueous solution to form a first solution;
    reducing the temperature of the first solution to below the freezing point of the aqueous solution;
    displacing the aqueous solution with a first solvent that has a lower surface tension than a surface tension of the aqueous solution;
    drying the first solvent to produce a porous biopolymer having a bulk density of 500 grams per cubic meter to 2500 grams per cubic meter.

2. The method of claim 1, further comprising displacing the first solvent with a second solvent that has a lower surface tension than a surface tension of the first solvent.

3. The method of claim 1, where the drying is conducted at a temperature of 15 to 150° C.

4. The method of claim 1, where the temperature is reduced to a temperature of 0 to −196° C.

* * * * *